No. 712,981. Patented Nov. 4, 1902.
B. R. VAN KIRK.
SUPPORTING DEVICE FOR ELECTRIC MOTORS.
(Application filed July 18, 1902.)
(No Model.) 2 Sheets—Sheet 1.
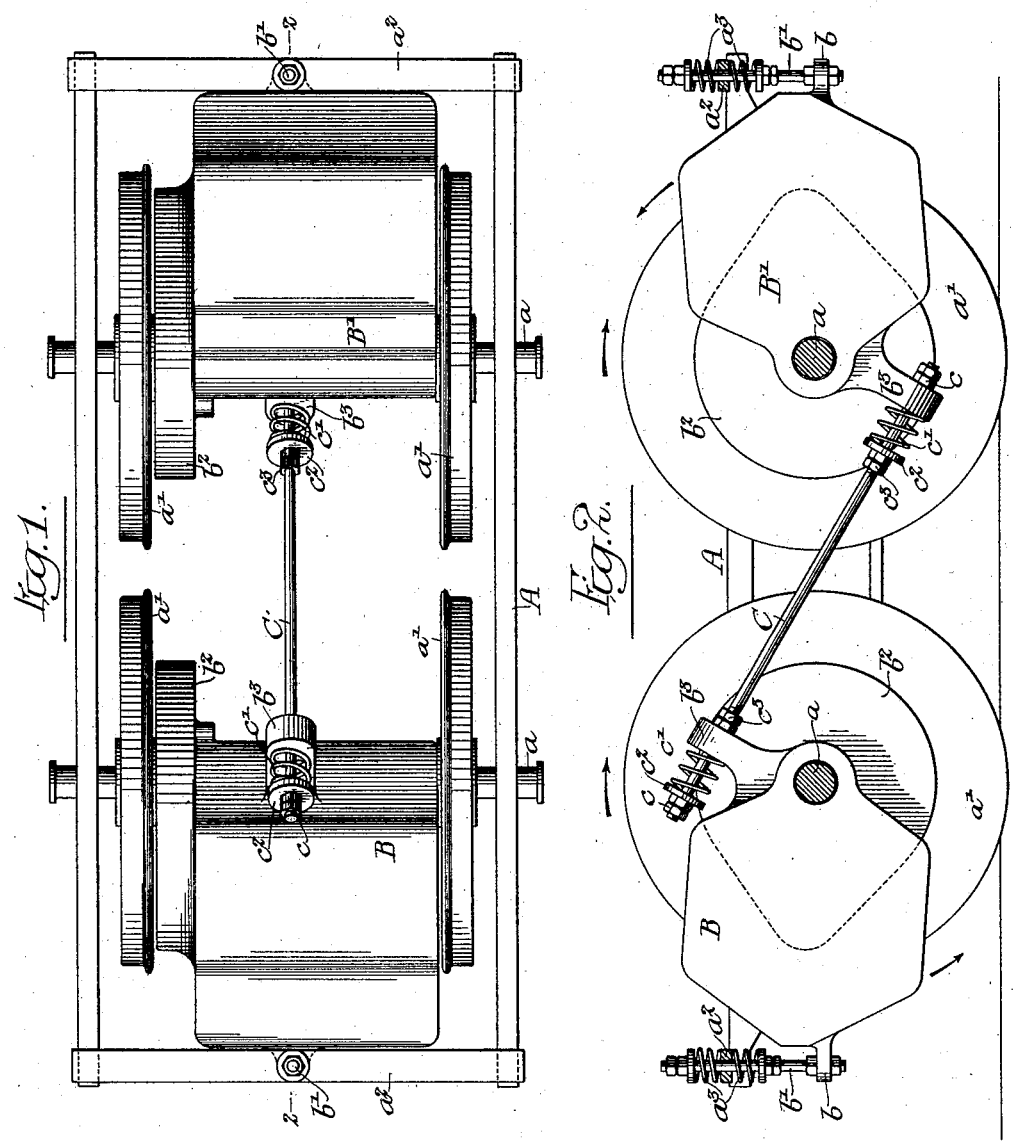
Witnesses:-
Herman E. Metius.
James E. Krayer.
Inventor:-
Benjamin R. Van Kirk,
by his Attorneys;
Howson & Howson

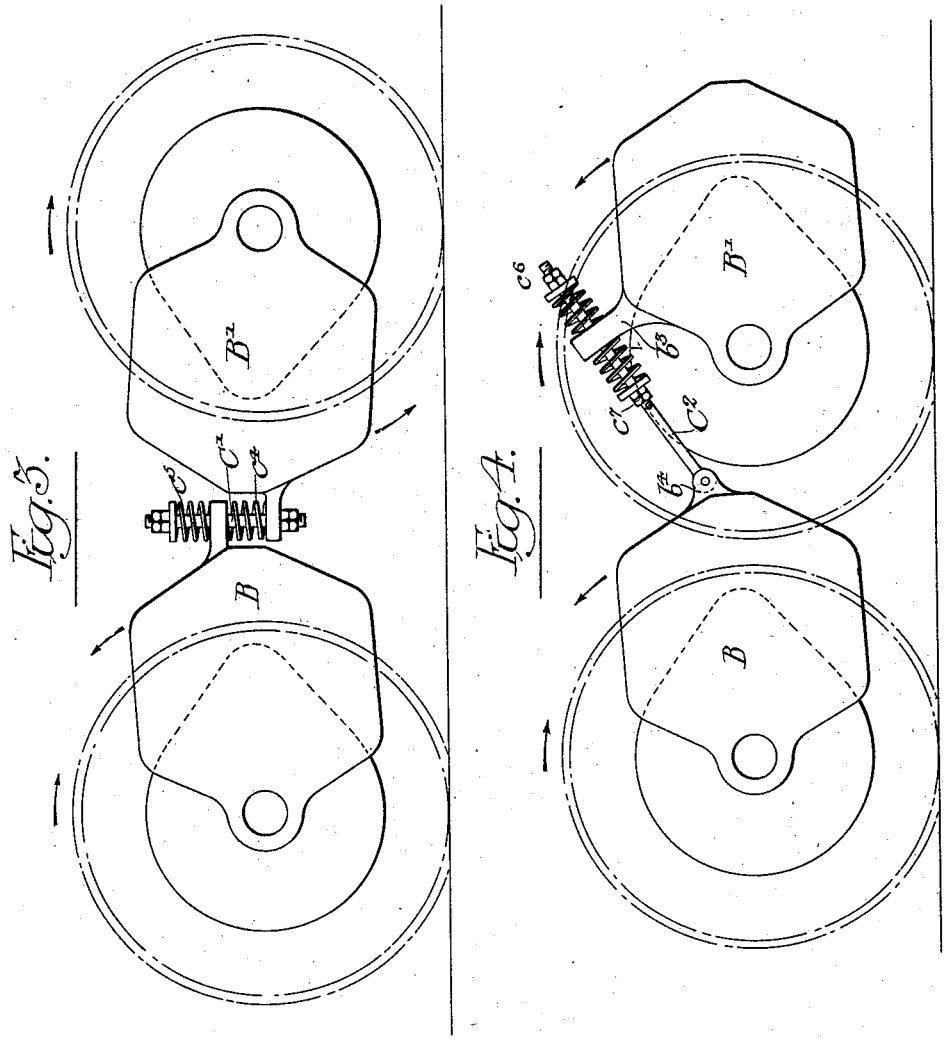

UNITED STATES PATENT OFFICE.

BENJAMIN R. VAN KIRK, OF PHILADELPHIA, PENNSYLVANIA, ASSIGNOR TO BURNHAM, WILLIAMS & COMPANY, OF PHILADELPHIA, PENNSYLVANIA, A FIRM.

SUPPORTING DEVICE FOR ELECTRIC MOTORS.

SPECIFICATION forming part of Letters Patent No. 712,981, dated November 4, 1902.

Application filed July 18, 1902. Serial No. 116,056. (No model.)

*To all whom it may concern:*

Be it known that I, BENJAMIN R. VAN KIRK, a citizen of the United States, residing in Philadelphia, Pennsylvania, have invented certain Improvements in Supporting Devices for Electric Motors, of which the following is a specification.

My invention consists of an improved construction for supporting electric motors having for its object the provision of a device whereby the force of the mechanical reaction due to the operation of one electric motor upon an electric locomotive or other vehicle shall be utilized to neutralize the similar reactive force of a second motor upon such vehicle. This object I attain in the following manner, reference being had to the accompanying drawings, in which—

Figure 1 is a plan view of a car or locomotive truck, showing two motors supported thereon according to my invention. Fig. 2 is a sectional elevation on the line 2 2, Fig. 1. Fig. 3 shows the application of my invention to an electric vehicle in which the motors are supported between the two axles or shafts which they operate, and Fig. 4 is a sectional elevation showing two motors supported in accordance with my invention when one is placed between the two wheel-axles and the other is supported outside of the same.

In the above drawings, A represents the framework of a truck of an electric car, locomotive, or other vehicle, this being carried upon axles $a$, having wheels $a'$, the whole being of the customary construction familiar to those skilled in the art.

B B' represent two motors of the truck, these being carried in the construction shown in Fig. 1 partly by their respective axles $a$ and partly by the transverse members $a^2$ of the truck. As shown in Fig. 2, each motor has a lug $b$, through which passes a bolt $b'$, suspending it from said transverse member $a^2$, there being preferably springs $a^3$, placed between the bolt and the member $a^2$ to overcome the objections to a rigid connection. The motors are geared to their respective axles in the well-known manner, the gear-cases being illustrated at $b^2$. As illustrated in the figures, each of the motors is provided with a projecting lug $b^3$, and one motor, as B, has its lug projecting upwardly from a point above its point of attachment to the axle $a$, while the other motor has its lug projecting downward at a point below its axle $a$. A bar C of suitable dimensions connects these lugs, preferably passing through suitable openings in them, being provided with springs, as shown, so as to make such connection of a yielding nature. In the case illustrated in Figs. 1 and 2 the motors are supported outside of the space between the two axles $a$, and it will be seen that the lug projecting from the motor B' engages nut $c$, screwed onto the end of the bar, while upon its other side it engages a spring $c'$, held in position by means of the washer $c^2$ and a second series of nuts $c^3$, the end of the rod C engaging the lug $b^3$ of the motor B as its spring $c'$ plays between said lug and this end series of nuts $c$. If it be desired to place the motors in the space between the wheel-axles, as in Fig. 3, I provide them with lugs, as set forth above, and connect said lugs by a bolt or bar C', preferably inserting a spring $c^4$ between the lugs and a second spring $c^5$ between the end of the bolt and one of the lugs. If, as in Fig. 4, one of the motors be inside of the space between the wheel-axles and the other outside, I preferably provide the outside motor with a lug $b^3$, as in Fig. 1, and the motor extending within the space between the wheel-axles with the lugs $b^4$, connecting said lugs by a rod $C^2$ and placing springs on said rod between the series of nuts $c^6$ at its end and between said lug and a second series of nuts $c^7$.

In operation it will be seen that when current is supplied to the motor B, so as to turn the wheels to which it is attached in the direction indicated by the arrow in Fig. 2, the reactive force upon the motor will tend to revolve it around the axle $a$, as shown. Similarly, when the motor B' is operated so as to move its pair of wheels in the same direction as the first pair the reactive force will tend to turn said motor around its axle in the direction opposite to that in which the wheels turn. Upon an inspection of Fig. 2 it will be seen that these reactive forces are so utilized as to be made to act against or neutralize one another through the medium of the connecting bar or rod C, and although the springs $c'$ are not necessarily employed between the lugs $b^3$ and said bar I preferably place them as shown. Similarly, in the arrangements shown in Figs. 3 and 4 the direct connection of one motor to the other permits of the complete or partial neutralization of the reactive torque set up when the motors are in operation and a consequent very material and advantageous reduction in the pressure and strain upon the various members of the truck of the vehicle.

I claim as my invention—

1. The combination of two motors and a supporting-shaft for each of the same, with a link connecting the frames of said motors and extending from a point on one motor above its shaft to a point on the other below its shaft, whereby the tendency of one motor to rotate as a whole around its shaft is made to oppose the similar tendency of the second motor, substantially as described.

2. The combination with two shafts or axles, of two motors carried respectively by said shafts, lugs on the motors, the lug on one motor being above and the lug on the other being below the point of attachment to its support, a shaft, and a link attached to said lugs and connecting the motors, said link including a spring or springs whereby such connection is made yielding to a greater or less extent, substantially as described.

3. The combination of two motors with a connecting-bar for the same, said motors having means for attachment to said bar and being supported so that they have a tendency to rotate as a whole when in operation, such bar with its attaching means being placed to oppose such tendency and extending from a point on one motor above its axis of rotation to a point on the other motor below its axis of rotation, substantially as described.

4. The combination of two axles, a motor supported upon each of the same, a lug on each motor, a bar extending between said lugs, one side of one of the lugs being in solid engagement with the bar and the other side thereof being in yielding engagement with said bar, substantially as described.

5. The combination of two axles, a motor supported upon each of the same, a lug on each motor, a bar extending between said lugs, said bar having a projection in solid engagement with one side of each lug and having a spring between the other side of each lug and the second projection, substantially as described.

In testimony whereof I have signed my name to this specification in the presence of two subscribing witnesses.

BENJAMIN R. VAN KIRK.

Witnesses:
FLORENCE HILLMAN,
WILL. A. BARR.